United States Patent [19]

Oberhans

[11] 4,419,824

[45] Dec. 13, 1983

[54] DIGITAL ELECTRICAL LENGTH MEASURING INSTRUMENT

[75] Inventor: Johann Oberhans, Buchoster, Fed. Rep. of Germany

[73] Assignee: Dr. Johannes Heidenhain GmbH, Traunreut, Fed. Rep. of Germany

[21] Appl. No.: 403,800

[22] Filed: Jul. 30, 1982

[30] Foreign Application Priority Data

Aug. 11, 1981 [DE] Fed. Rep. of Germany ....... 3131673

[51] Int. Cl.³ .............................................. G01B 3/18
[52] U.S. Cl. ................... 33/143 L; 33/165; 33/166
[58] Field of Search ............. 33/143 L, 147 N, 147 F, 33/164 R, 165, 166, 154 B, 178 E, 143 F, 125 C

[56] References Cited

U.S. PATENT DOCUMENTS

| | | | |
|---|---|---|---|
| 3,340,616 | 9/1967 | Mincuzzi | 33/166 |
| 3,416,380 | 12/1968 | Faustini | 74/89.15 |
| 4,062,120 | 12/1977 | Lacagnina et al. | 33/166 |
| 4,063,362 | 12/1977 | Amsbury et al. | 33/143 L |
| 4,215,480 | 8/1980 | Fisher et al. | 33/125 C |

FOREIGN PATENT DOCUMENTS

| | | | |
|---|---|---|---|
| 44823 | 1/1982 | European Pat. Off. | 33/166 |
| 710032 | 9/1941 | Fed. Rep. of Germany | 33/147 K |
| 2413997 | 9/1974 | Fed. Rep. of Germany | |
| 2731294 | 1/1979 | Fed. Rep. of Germany | |
| 2925069 | 1/1980 | Fed. Rep. of Germany | |
| 527407 | 1/1971 | Switzerland | |
| 2066959 | 3/1979 | United Kingdom | |
| 2027880 | 2/1980 | United Kingdom | 33/166 |

Primary Examiner—Willis Little
Attorney, Agent, or Firm—Willian, Brinks, Olds, Hofer, Gilson & Lione Ltd.

[57] ABSTRACT

A digital, bow-type measuring instrument is disclosed which provides rapid adjustment of the position of a measuring bolt with respect to an anvil over the entire measuring range. The instrument is used by rapidly translating the bolt into position such that the object being measured is positioned between the anvil and the bolt. Thereupon, the bolt is locked in position with the aid of a locking system so as to fix the measuring bolt in position with great rigidity while applying a predetermined measuring force to the bolt. In this way, an instrument is provided which makes possible precise measurements of heavy or fixed objects by means of a bow-type measuring instrument which allows rapid shifting of the measuring bolt.

14 Claims, 4 Drawing Figures

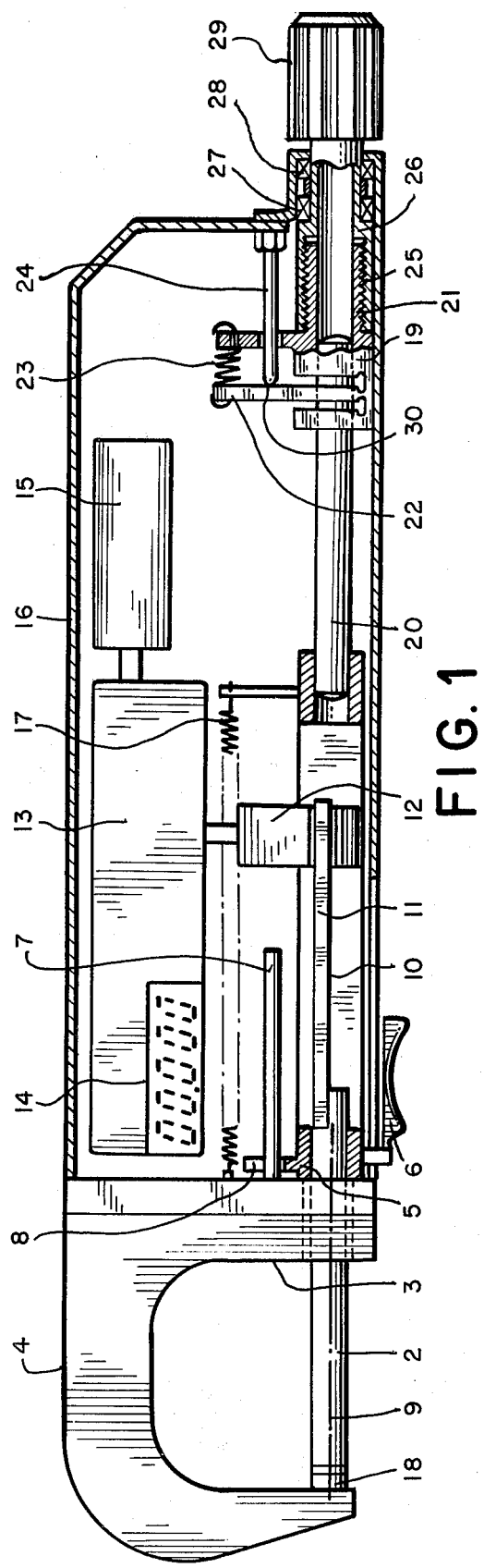
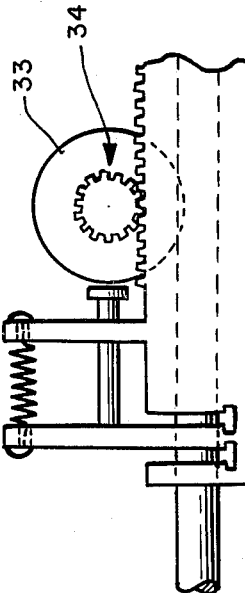
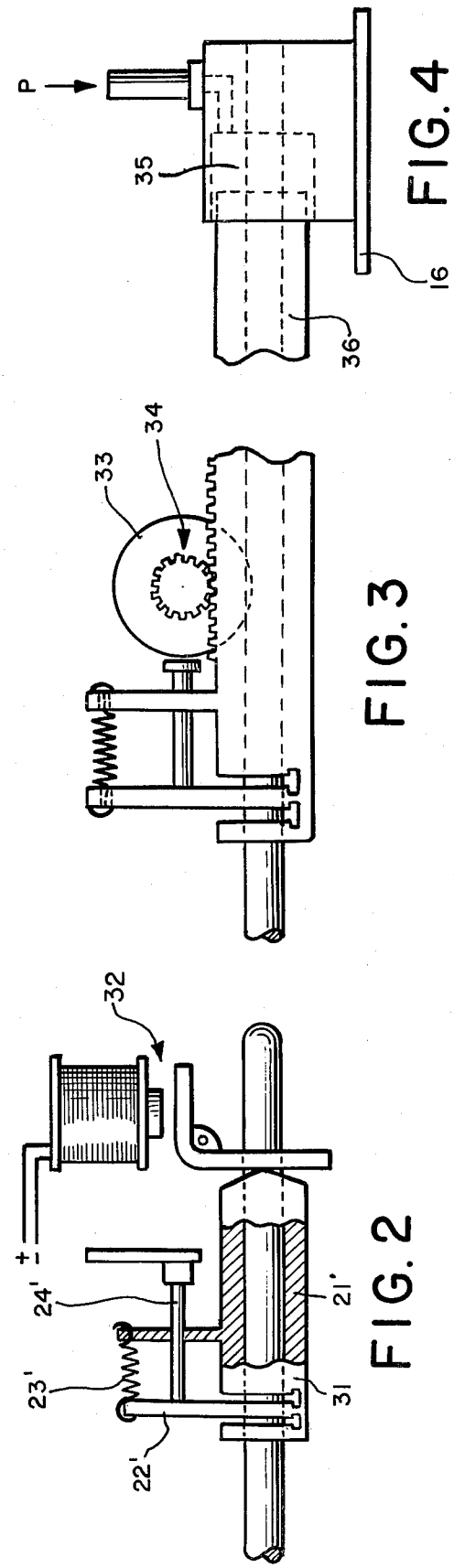

DIGITAL ELECTRICAL LENGTH MEASURING INSTRUMENT

BACKGROUND OF THE INVENTION

This invention relates to improvements to digital, electrical length measuring instruments of the type comprising a bow, an anvil mounted on the bow, a measuring bolt continuously slidable with respect to the anvil in a longitudinal direction, and a transducer which comprises means for sensing the longitudinal position of the bolt with respect to the bow.

A wide range of such length measuring instruments are known to the art. For example, in German DE-AS No. 24 13 997 there is described a bow-type measuring instrument which utilizes a translatorialy operating measurement transducer which is responsive to the relative movement of two measuring surfaces and acts to measure the separation between the two measurement surfaces and to display this measurement in digital form. In the disclosed instrument, the relative movement of the two measurement surfaces is carried out by means of a spindle-nut arrangement, as is usual in the case of screw-type bow measuring instruments. The contact pressure with which the two measurement surfaces are biased together is adjustable by means of a ratchet mechanism.

A similar arrangement is described in German DE-OS No. 29 25 069; however, in this specification the position measurement is implemented with a rotationally operating measurement transducer.

Such digital, electrical, bow-type measuring instruments have a disadvantage that they are cumbersome to handle if objects with widely differing lengths within a prescribed measuring zone are to be measured. In such cases, large scale adjustments of the position of the measuring screw must be made laboriously by means of a spindle with low pitch.

Another type of digital, electrical, length measuring instrument known to the art utilizes direct translatory shifting of the measuring bolt to allow relatively rapid adjustment of the position of the measuring bolt within its measuring range. In these instruments, the measuring bolt is separated from the anvil by an operator by pressing the bolt against a restoring force provided by a spring. The spring also delivers a largely constant measuring force. In this context, three documents should be mentioned: German DE-OS No. 27 31 294, Swiss Pat. No. 527 407, and U.S. Pat. No. 4,215,480. Length measuring instruments of this second type overcome to a large extent the drawbacks of the first mentioned group with respect to rapid adjustment of the position of the measuring bolt within the measuring range. However, in every day workshop use the above described examples of measuring instruments of the second type present another serious drawback, which up to now has severely limited the practical uses of these hand measuring instruments in every day operation. In the measurement of heavy or fixed objects, for example work pieces clamped in machine tools, it is often not possible in practice to hold the measuring instrument by hand in such precise orientation with respect to the surface to be measured that an unambiguous measurement result is readable on the instrument display. Even the slightest tilting of the hand measuring instrument leads to a displacement of the measuring bolt and thereby to an altered measurement value. This alteration in the measurement value is perceived by an ever changing display. Small objects that can be clamped between the measurement surfaces of the anvil and the measuring bolt can be measured exactly only if the restoring force of the spring which biases the measuring bolt against the anvil is great enough to hold the object being measured firmly between the measuring surfaces.

SUMMARY OF THE INVENTION

The above described disadvantages are well known to the art and can present severe drawbacks to the use of known hand measuring instruments.

The present invention is directed to a length measuring instrument which to a large extent overcomes the disadvantages discussed above. The length measuring instrument of this invention is rapidly adjustable throughout the entire measurement range of the instrument, and yet it nevertheless makes possible exact measurements even of fixed objects. The measuring instrument of this invention insures accurate and precise reading of the measurement result.

According to this invention, a length measuring instrument of the type described above is provided with means for locking the bolt in position with respect to the anvil, and means, included in the locking means, for biasing the bolt in the direction of the anvil with a predetermined measuring force. The biasing means is operative only when the bolt is locked in position by the locking means, such that the biasing means does not interfere with the free and rapid positioning of the bolt throughout its measuring range.

The measuring instrument of this invention provides the twin advantages that it is readily and quickly adjustable to any measuring position within its measuring range, and yet it can be used to obtain an accurate and reliable measurement of heavy or fixed objects. Further advantageous features of the invention are set forth in the attached dependent claims.

The invention itself, together with further objects and attendant advantages, will best be understood by reference to the following detailed description taken in conjunction with the accompanying drawings.

BRIEF DESCRIPTION OF THE DRAWINGS

FIG. 1 is a side view in partial cutaway of a first preferred embodiment of the measuring instrument to this invention which incorporates a manually operated locking arrangement.

FIG. 2 is a partial view of a second preferred embodiment of this invention which incorporates an electromagnetically operated locking arrangement.

FIG. 3 is a partial view of a third preferred embodiment which incorporates an electric motor driven locking arrangement.

FIG. 4 is a partial view of a fourth preferred embodiment which includes a pneumatically operated locking arrangement.

DETAILED DESCRIPTION OF THE PRESENTLY PREFERRED EMBODIMENTS

Turning now to the drawings, FIG. 1 shows a hand measurement instrument 1 which includes a measuring bolt 2 which is shiftable continuously along a longitudinal direction. The measuring bolt 2 is precisely guided in a shank 3 of a bow 4, and the measuring bolt 2 is fixed in position in a receiver 5. The receiver 5 defines a protruding element 6 which serves for longitudinal shifting of the measuring bolt 2, as described below.

The receiver 5 also defines a guide sleeve 8 which cooperates with a guide rod 7 which is stationarily mounted with respect to the shank 3. The combination of the guide rod 7 and the guide sleeve 8 serves to prevent undesirable rotation of the measuring bolt 2 with respect to the bow 4. The guide rod 7 runs parallel to the longitudinal direction defined by the measuring bolt 2.

A grid scale 11 is mounted to the measuring bolt 2 in a straight line extension of the longitudinal axis 9 of the measuring bolt 2. In this embodiment, the scale 11 is formed of glass, and it defines a grid division 10 which is centered on the longitudinal axis 9 of the bolt 2. In this embodiment, the grid division 10 is photoelectrically scanned by a scanning unit 12.

It should be understood that the present invention can be embodied in measuring instruments which utilize other types of measuring transducers. For example, it is within the scope of this invention to use inductive, capacitive, magnetic, or other types of measuring transducers. Likewise, it is not essential that the measuring transducer operate translatorialy as shown, for it is well within the skill of those skilled in this art to substitute means for transferring the translatory movement of the measuring bolt 2 into rotary movement to activate an angular measuring transducer.

The scanning unit 12 operates to generate measuring signals which are applied as inputs to an evaluating circuit 13. The evaluating circuit 13 processes the measuring signals in a known manner to generate a measurement value which is displayed in digital form on a display 14. Of course, the evaluating circuit 13 can be mounted outside the hand measuring instrument 1, as can the current supply 15. In the illustrated embodiment, the current supply 15 comprises silver-zink accumulators, and both the evaluating circuit 13 and the current supply 15 are mounted inside the handle 16 of the measuring instrument 1.

In the rest position shown in FIG. 1, a spring 17 biases the measuring bolt 2 into contact with an anvil 18. As shown in FIG. 1, the anvil 18 is mounted to the bow 4 on the longitudinal axis 9. With the aid of the protruding element 6 the measuring bolt 2 can be moved away from the anvil 18 in a continuous and stepless manner. The measuring transducer formed of elements 10, 11, and 12 measures the movement of the measuring bolt 2 away from the anvil 18 to determine the separation between the bolt 2 and the anvil 18. The resulting measurement is displayed in digital form on the display 14.

In order to obtain precise and accurate measurements, the measuring force acting on the object being measured should preferably be held constant. The restoring spring 17 satisfies this condition only approximately. This also true for the rapidly adjustable hand measuring instruments discussed above in the section entitled "Background of the Invention." Furthermore, the restoring force of spring 17 on the measuring bolt 2 cannot be made arbitrarily great, since unduly large restoring forces would substantially impair the operating comfort of the instrument. It has been found that instruments which apply a measurement force on the object being measured in the range of a few newtons exhibit undesirable movement of the measuring bolt. With measurement forces of this order of magnitude it is almost impossible to avoid manual tilting of the hand held measuring instrument during measurement. As explained above, such tilting generally results in fluctuations in the measured position value.

In order to overcome these problems, the hand measuring instrument 1 of this invention includes a locking arrangement 19 which acts to clamp the measuring bolt 2 securely in the final measuring position on the object being measured. In this embodiment, a rod 20 is mounted securely to the receiver 5 to form a longitudinal extension of the measuring bolt 2. The rod 20 is preferably positioned on the longitudinal axis 9 of the bolt 2. A sleeve 21 is positioned around the rod 20 such that as the measuring bolt 2 moves away from the anvil 18, the rod 20 slides more deeply into the sleeve 21. Sleeve 21 includes at one end a spring-biased tongue or plate 22 which is biased by a spring 23 toward an adjustable stop 24. In alternate embodiments having suitable materials and dimensions of the tongue 22, the spring 23 can be dispensed with if the tongue 22 is installed with sufficient pretension. At the other end of the sleeve 21 there is arranged on the outer circumference of the sleeve 21 a thread 25 which is surrounded by a nut 26. The nut 26 is rotatably mounted in the handle 16 by means of ball bearings 27, 28, such that the rotational axis of the nut 26 is fixed but the nut 26 is rotatable with respect to the housing 16. Mounted to the free end of the nut 26 is a turning knob 29 which is coupled by means of a ratchet (not shown) to the nut 26. The ratchet and the knob 29 allow the contact measuring force applied via the measuring bolt 2 on the object being measured to be adjusted exactly. Preferably, the contact measuring force should be chosen such that the measurement surfaces of the measuring bolt 2 and the anvil 18 are arranged precisely parallel to one another and the hand measuring instrument 1 is clamped to the object being measured such that the hand measuring instrument 1 is self-supporting (i.e. without manual support) on the object being measured. In this way it is insured that undesired tilting of the hand held measuring instrument is prevented during the measurement process and high, reliable, constant measuring forces are provided. This reliable method of in effect clamping a hand measuring instrument onto an object being measured is known and often used in conjunction with workshop tools such as bow-type measuring screws. However, in bow-type measuring screws as mentioned at the outset, the entire measuring range must be turned through laboriously by means of a spindle of low pitch if objects with widely differing dimensions are to be measured.

The following is a description of a method for using the instrument of FIG. 1 which illustrates the simplicity and the advantages of the measuring instrument of this invention over the state of the art.

In use, the operator takes the hand measuring instrument 1 in both hands and switches on the evaluating circuit 13. In order to calibrate the instrument 1 the operator rotates the knob 29 with the ratchet until, in consequence of the torque limitation of the ratchet, the knob 29 applies a predetermined force against the sleeve 21. In the initial rotation of the knob 29, the sleeve 21 is slightly shifted by the nut 26 in the direction of the anvil 18. Since the spring-biased tongue 22 rests on the stop 24, the movement of the sleeve 21 in the direction of the anvil 18 tilts the tongue 22 slightly about the engagement point 30, and thereby clamps the tongue 22 to the rod 20 which thereby is likewise slightly shifted in the direction of the anvil 18. However, since the spring 17 has already drawn the measuring bolt 2 against the anvil 18, this further movement of the rod 20, which is rigidly joined with the measuring bolt 2 on its longitudinal axis 9, serves only to move the measuring bolt 2 very slightly in the direction of the anvil 18. This movement is opposed by the bow 4, which is distorted slightly as result of the measurement force applied by means of the ratchet.

This slight distortion of the bow 4 occurs reliably and repeatably with all measurements, since the measuring force applied with the aid of the ratchet is the same in each measurement. Through the tilting of the tongue 22, the rod 20 and thereby the measuring bolt 2 are clamped with high rigidity in the longitudinal direction. The calibrating process is completed when the operator sets the evaluating circuit 13 and thereby the display 14 to zero. For the zero setting, a zeroing key (not shown) of a known type is provided. Because elements such as a zero key and the on/off switch for the evaluating circuit 13 are well known to those skilled in the art, they are not shown in the drawings.

The above described calibrating process serves to eliminate the effect of the measuring force on the bow 4 in subsequent measurements, since this effect is constant.

After calibration has been completed, a slight rotation of the knob 29 in the reverse direction allows the nut 26 and the sleeve 21 to move slightly away from the anvil 18. This allows the tongue 22 to return to its original position, thereby disengaging the tongue 22 from the rod 20 such that the rod 20 is once again free to slide freely through the aperture in the tongue 22.

With the aid of the protruding element 6, the operator can now shift the measuring bolt easily and rapidly against the relatively slight restoring force of the spring 17 throughout the entire measuring range. The bolt 2 can be moved to accommodate an arbitrarily large object to be measured, and this can all be done with one hand. After the object being measured has been positioned between the anvil 18 and the bolt 2 and the spring 17 has been allowed to move the bolt 2 approximately into position, the knob 29 is then turned until the ratchet begins to slip. At this point, the object being measured is clamped fast with a predetermined measuring force between the measurement surfaces of the anvil 18 and the measuring bolt 2. The operator can then release the measuring instrument 1 such that it is self-supporting on the object being measured, and can then read the measured value on the display 14. The displayed measurement will be substantially constant and unchanging, because the hand measuring instrument is not being manually tilted with respect to the object being measured.

As shown in FIG. 2, a second preferred embodiment of the present invention substitutes an electromagnetic locking arrangement 31 for the ratchet mechanism described above. This electromagnetic locking arrangement 31 includes clamping elements 21', 22', 23', 24', which operate similarly to corresponding elements of the preferred embodiment of FIG. 1. The main difference between these two embodiments is that the embodiment of FIG. 2 includes an electromagnetic arrangement 32 which acts to drive the sleeve 21' toward the anvil. This electromagnetic arrangement 32 can for example comprise a solenoid and bell crank system of the type shown in FIG. 2. This second preferred embodiment has the advantage that the clamping of the measuring bolt 2 can be remotely controlled, as for example by means of an electrical switch for the electromagnetic arrangement 32 situated adjacent to the protruding element 6. In this way, one hand operation of the instrument is made possible. The disadvantage of higher current consumption for the electromagnetic clamping device of FIG. 2 is acceptable in many applications. This is particularly true in measuring instruments of the type which utilize an external power supply for the evaluating circuit 13.

FIG. 3 illustrates a portion of a third preferred embodiment which utilizes a locking arrangement that includes an electric motor 33 which is coupled to the tongue by means of a gear train 34. FIG. 4 illustrates portions of a fourth preferred embodiment which utilizes a locking arrangement that is pneumatically actuated by means of compressed air P which flows into a cavity defined by an annular cylinder 35 and serves to move an annular piston 36 in the longitudinal direction. Thus, a wide range of arrangements can be used to move the tongue 22 from an unlocked position to a locked position and to bias the tongue 22 and therefore the rod 20 in the direction of the anvil 18 with a predetermined measurement force.

It should also be understood that the present invention can be embodied in locking arrangements which do not include a spring biased tongue of the type shown in FIGS. 1, 2, and 3. Those skilled in the art will recognize that other clamping arrangements (such as for example eccentric clamping devices) can also be used. It also lies in the scope of this invention to clamp the measuring bolt 2 directly, if, for example, a clamping device of the type described above is arranged in the shank 3 of the bow 4. Those skilled in the art will be able to determine the most advantageous spatial arrangement of the clamping and biasing means of this invention according to desired instrument dimensions and the intended use of the instrument, all without departing from the scope of this invention.

Of course, it should be understood that if the measuring instrument 1 of FIG. 1 is used to measure small and light objects (such as for example fitting pins) the locking mechanism 19 need not be used if the restoring force of the spring 17 is sufficient to clamp the object being measured between the measuring surfaces of the anvil 18 and the measuring bolt 2. In this case, the instrument 1 should be calibrated without operating the locking mechanism 19, since then only the forces of the spring 17 act on the bow 4.

As mentioned above, a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a digital, electronic length measuring instrument of the type comprising a bow, an anvil mounted to the bow, a measuring bolt continuously and directly slidable with respect to the anvil in a longitudinal direction, and a transducer which comprises means for sensing the longitudinal position of the bolt, the improvement comprising:

a locking coupler having locked and unlocked orientations;

means for connecting the locking coupler with the bolt such that the bolt is rigidly clamped in position with respect to the locking coupler in the longitudinal direction when the locking coupler is locked, and the bolt is freely slidable with respect to the locking coupler when the locking coupler is unlocked; and means for rigidly securing the locking coupler in place with respect to the anvil and for applying a predetermined measuring force on the locking coupler in the direction of the anvil;

said locking coupler, connecting means, and securing means cooperating to lock the bolt securely in place with respect to the anvil and to apply a substantially constant measuring force to the bolt to bias the bolt against an object being measured between the anvil and the bolt.

2. The invention of claim 1 wherein the securing means comprises:

a rotatable knob; and means, responsive to the angular position of the knob, for moving the locking coupler in the direction of the anvil.

3. The invention of claim 1 wherein the securing means is electromagnetically powered.

4. The invention of claim 1 wherein the securing means comprises:

an electric motor; and gear means for coupling the electric motor to the locking coupler.

5. The invention of claim 1 wherein the securing means is pneumatically powered.

6. The invention of claim 1 or 3 or 4 or 5 wherein the invention further comprises:

a protruding element coupled to the bolt to allow manual withdrawal of the bolt away from the anvil;

means, positioned adjacent the protruding element, for remotely actuating the locking coupler to the locked orientation.

7. In a digital, electronic length measuring instrument of the type comprising a bow, an anvil mounted to the bow, a measuring bolt continuously and directly slidable with respect to the anvil in a longitudinal direction, and a transducer which comprises means for sensing the longitudinal position of the bolt, the improvement comprising:

means for selectively locking the bolt in position with respect to the anvil, said locking means comprising:

a rod coupled to the bolt;

a clamping element coupled to the rod to clamp the rod when the clamping element is tilted to a first angular position and to release the rod when the clamping element is tilted to a second angular position; and a longitudinally shifting member positioned to contact the clamping element to move the clamping element between the second and first angular positions; and means, included in the locking means, for biasing the bolt in the direction of the anvil with a predetermined measuring force, said biasing means operative only when the bolt is locked in position by the locking means.

8. The invention of claim 7 wherein the clamping element defines an aperture sized to receive the rod.

9. The invention of claim 7 wherein the biasing means further comprises:

a rotatable knob; and means, responsive to the angular position of the knob, for moving the longitudinally shifting member to move the clamping member to the first angular position, and for biasing the longitudinally shifting member toward the anvil.

10. The invention of claim 7 wherein the biasing means comprises:

electromagnetically powered means for moving the longitudinally shifting member to move the clamping member to the first angular position, and for biasing the longitudinally shifting member in the direction of the anvil.

11. The invention of claim 7 wherein the biasing means comprises:

an electric motor; and gear means for coupling the electric motor to the longitudinally shifting member such that the motor is operative to move the longitudinally shifting member to move the clamping member to the first angular position and to bias the shifting member in the direction of the anvil.

12. The invention of claim 7 wherein the biasing means comprises:

a pneumatically operated piston coupled to the longitudinally shifting member to move the shifting member to move the coupling member to the first angular position, and to bias the rod via the clamping member and the shifting member in the direction of the anvil.

13. The invention of claim 2 or 10 or 11 or 9 wherein the invention further comprises:

a protruding element coupled to the bolt to allow manual withdrawal of the bolt away from the anvil; and means, positioned adjacent the protruding element, for remotely actuating the locking means.

14. In a digital, electronic length measuring instrument of the type comprising a bow, an anvil mounted to the bow, a measuring bolt continuously slidable with respect to the anvil in a longitudinal direction, and a transducer which comprises means for sensing the longitudinal position of the bolt, the improvement comprising:

a rod coupled to the bolt to form a longitudinal extension thereof;

a plate defining an aperture which surrounds the rod, said aperture sized such that the rod is locked to the plate when the plate is in a first angular position and the rod moves freely through the plate when the plate is in a second angular position;

means for securing a first portion of the plate in position with respect to the bow; and means for selectively locking a second portion of the plate in position with respect to the anvil and for biasing the second portion of the plate towards the anvil with a measuring force, said locking means operative both to move the plate to the first angular position in order to lock the plate to the rod and to bias the bolt toward the anvil by means of the plate and the rod such that the measuring force can selectively be applied to the bolt with the bolt in a wide range of positions with respect to the anvil.

* * * * *